United States Patent [19]
Klavetter

[11] Patent Number: 5,312,897
[45] Date of Patent: May 17, 1994

[54] N-PHENYLHYDROXYLAMINE POLYMER, METHOD OF PREPARATION

[75] Inventor: Floyd Klavetter, Santa Barbara, Calif.

[73] Assignee: Neste Oy, Kulloo, Finland

[21] Appl. No.: 927,917

[22] Filed: Aug. 11, 1992

[51] Int. Cl.$^5$ .............................................. C08G 73/00
[52] U.S. Cl. ...................................... 528/422; 526/310;
526/311; 526/312; 526/313; 528/12; 528/23;
528/207; 528/208; 528/210; 528/220; 528/222;
528/223; 528/373; 528/391
[58] Field of Search ............... 528/422, 373, 391, 12,
528/23, 207, 208, 210, 220, 222, 223; 526/310,
311, 312, 313

[56] References Cited
PUBLICATIONS

M. Angelopoulous et al., *Mol. Cryst. Liq. Cryst.* 160:151 (1988).
Y. Cao et al., *Polymer* 30:2305 (1989).
A. G. MacDiarmi et al., *Mol. Cryst. Liq. Cryst.* 125:309–318 (1985).
D. Vachon et al., *Synthetic Metals,* 18:297 (1987).

*Primary Examiner*—Harold D. Anderson
*Attorney, Agent, or Firm*—Reed & Robins

[57] ABSTRACT

Electroactive polymers are provided which contain alternating phenyl rings and nitrogen atoms, and which contain both quinoid mer units and benzenoid mer units. The polymers are formed by poly(condensation) of N-phenylhydroxylamine or derivatives thereof under anhydrous conditions in the presence of a Lewis acid catalyst. Methods for producing films, fibers and shaped articles of the polymers are provided as well.

15 Claims, 2 Drawing Sheets

N-PHENYLHYDROXYLAMINE POLYMER, METHOD OF PREPARATION

TECHNICAL FIELD

This invention relates generally to electroactive polymers. More particularly, the invention relates to a novel class of polymers prepared by poly(condensation) of N-phenylhydroxylamine or derivatives thereof, and to a process for preparing such polymers. The invention further relates to fibers, films, and the like, which may be prepared from the novel electroactive polymers.

BACKGROUND

The first known foray into the synthesis of poly(aromatic amines) dates back to 1834, when Runge oxidized aniline to an intractable green-black solid. The more severe the oxidation—typical oxidants included persulfate, dichromate, or chlorate compounds—the blacker the substance produced, and the less soluble the material was in concentrated acids. These compounds were tested as dyes, and by the 1870's the highly oxidized "Aniline Blacks" became the first members of the polyaniline family to gain industrial importance.

Researchers came to realize that the synthesized "polyaniline" (more appropriately, "polyanilines"exists in many different forms, depending upon the conditions of preparation. Some batches of an Aniline Black dye would undergo "green-ing" after a short time, while others retained their deep black color upon prolonged wear. Decades of research into the chemical structure of these dyes provided some insight into the phenomenon. The "ungreenable" Aniline Black—that is, the most highly oxidized Aniline Black—is chemically different insofar as a substantial number of chemically irreducible moieties are present in the polymer backbone, not convertible to the green form of the polyanilines, which consists of a linear indamine-type structure. Various idealized states of the polyanilines are depicted below:

Leuco-emeraldine (white):

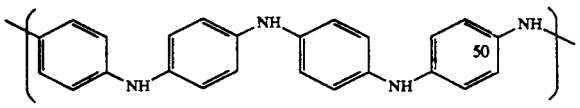

Emeraldine (blue or green):

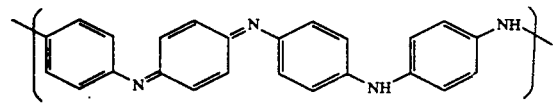

Perigraniline (red or violet):

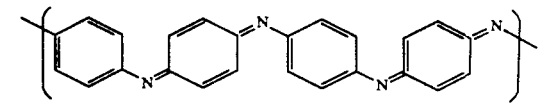

"Ungreenable" Polyaniline Black (black):

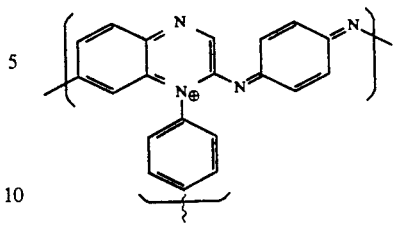

Emeraldine is blue in the basic form, but green in the acidic salt form. Perinigraniline is red in its pristine form, and is somewhat more bluish in its protonated form. The Aniline Black dyes obtained through severe oxidative polymerization of aniline are some combination of these idealized forms of polyaniline, including chemically irreducible moieties proposed as substituted phenazine rings. Willstätter and Moore demonstrated that through simple reduction-oxidation transformations these various oxidation states of the polyanilines are interconvertible ("Ungreenable" Aniline Black excepted). For example, leuco-Emeraldine can be oxidized to Emeraldine, and Emeraldine can be reduced to leuco-Emeraldine. Thus, the synthesis of any of these linear poly(phenyl amine) structures is a passport to the entire family of polyaniline polymers.

In 1985 it was reported that protonic acid doping of Emeraldine renders the material highly electrically conductive (A. G. MacDiarmid, J. -C. Chiang, W. Huang, B. D. Humphry, N. L. D. Somasiri, *Mol. Cryst. Liq., Cryst.* 125:309-318 (1985)). Emeraldine is prepared through a chemical or electrochemical polymerization of aniline under conditions similar to those used for Aniline Black. Cao et. al. (Y. Cao, A. Andreatta, A. J. Heeger, P. Smith, *Polymer* 30:2305 (1989)) determined optimum reaction conditions for the chemical synthesis as a function of a wide variety of synthetic parameters, including pH, relative concentrations of reactants, and polymerization time and temperature. Typically, the Emeraldine is prepared employing an aqueous suspension polymerization of aniline in a strongly acidic environment using strong chemical oxidants such as ammonium persulfate.

The poly(phenyl amines), and more specifically those polyanilines which are not highly over-oxidized, remain the most promising of conducting polymers, combining environmental stability, low cost of production, high conductivity, and a variety of chemically reversible oxidation and protonation states of different colors. Already batteries made from such materials are commercially available, as are blends for EMI shielding and anti-static applications.

Excepting F. Wudl's report of a multi-step synthetic preparation (Wudl et. al., *Synthetic Metals* 18:297 (1987)) which involves post-polymerization chemistry, the only reported polymerization route which yields a member of the family of polyanilines demonstrated to undergo reversible transformations of the various oxidized/reduced, protonated/de-protonated states has been through the oxidative polymerization of aniline in an aqueous acidic medium to form the material referred to as Emeraldine. Oxidation of the polymer occurs at a lower potential than that of the monomer, resulting in a tendency towards over-oxidation and a demonstrated propensity towards the formation of chemically irreducible units along the polymer backbone. It has been shown that exposure of Emeraldine to an aqueous acidic medium slowly degrades the properties of the material through side reactions (Y. Cao, A. Andreatta, A. J. Heeger, P. Smith, *Polymer* 30:2305 (1989))—hydrolysis of the quinoidal moieties which introduces oxygen into the polymer backbone has been demonstrated by several researchers (M. Angelopoulous, G. E. Asturias, S. P. Ermer, A. Ray, E. M. Scherr, A. G. MacDiarmid, *Mol. Cryst. Liq. Cryst.* 160:151 (1988))— which lower solubility in selected solvents and lower molecular weight. Thus, the Emeraldine is degraded by its own polymerization environment. The method of preparing this form of polyaniline is also disadvantageous. Since the conductive emeraldine salt so formed is insoluble, the oxidative polymerization of aniline in an aqueous medium affords only a heterogeneous route, requiring post-polymerization work-up prior to processing. To limit degradation during the chemical synthesis of polyaniline, conversion is often sacrificed by using a deficiency of oxidant. Side products of the polymerization reaction include unreacted aniline monomer (in salt form) and residual salts from the spent oxidant, complicating the industrial production process. The present invention involves a polymerization strategy which requires no oxidant, and resolves many of the drawbacks to the synthesis of polyaniline-type polymers by providing a bulk, homogeneous, cleaner polymerization route to electroactive polymers.

SUMMARY OF THE INVENTION

It is accordingly a primary object of the invention to address the aforementioned needs in the art by providing a novel class of electroactive polymers having stable oxidation and acidic states which are reversibly interchangeable with each other.

It is another object of the invention to provide such polymers which are substantially free of cross-links and irreducible species.

It is still another object of the invention to provide such polymers which are cost-effective to produce, acid-soluble, and readily processable into shaped articles, fibers, films, or the like.

It is yet another object of the invention to provide such materials in the form of polymers of N-phenylhydroxylamine and derivatives thereof.

It is a further object of the invention to provide such a polymer having a predetermined molecular weight, wherein one terminus of the polymer is capped with a trapping moiety.

It is still a further object of the invention to provide a method for making the aforementioned novel class of electroactive polymers.

It is yet a further object of the invention to provide such a method in which the polymer is produced via a poly(condensation) reaction carried out in an anhydrous environment in the presence of a Lewis acid catalyst.

It is an additional object of the invention to provide such a method in which the reaction product is free from the hydrolysis products and side reactions known to occur in the oxidative, aqueous suspension polymerization of aniline.

It is yet an additional object of the invention to provide films and fibers of the novel electroactive polymers.

Additional objects, advantages and novel features of the invention will be set forth in part in the description which follows, and in part will become apparent to those skilled in the art upon examination of the following, or may be learned by practice of the invention.

In one aspect, then, the present invention relates to electroactive polymers, including both homopolymers and copolymers, derived from the polymerization of substituted or unsubstituted N-phenylhydroxylamines. Poly(N-phenylhydroxylamine) and its derivatives belong to the larger family of materials known as the polyanilines, which in turn belongs to the larger class of poly(phenylamines), i.e., polymers which contain covalently linked phenyl rings and nitrogen atoms, in any oxidation state or acidic state consistent with valence bond rules, including those states in which radicals and/or charged species are present.

In another aspect, the invention encompasses a method for preparing such polymers of N-phenylhydroxylamine through a poly(condensation) reaction carried out under anhydrous conditions. The principles of poly(condensation) reactions are well known (Odian, G., *Principles of Polymerization,* 2nd ed., John Wiley, New York, Chapter 2, "Step Polymerization," pp. 40–178). The present non-oxidative methodology allows for the preparation of a vast number of electroactive, highly processable poly(arylamines) which have been heretofore unavailable. The method of the present invention also enables preparation of polymers of a wide variety of molecular weights, by making use of trapping agents which are effective to cap the growing polymer and terminate polymerization. The present method thus makes possible preparation of polymers whose solubility properties are enhanced (i.e., wherein a trapping agent is added and a lower molecular weight material is produced), or polymers in which physical properties such as tensile strength are enhanced (i.e., wherein no trapping agent is added, such that a higher molecular weight material is produced). The mode of polymerization further enables preparation of copolymers by polymerizing N-phenylhydroxylamine or a derivative thereof with comonomers which, like N-phenylhydroxylamine itself, are capable of undergoing electrophilic addition in an anhydrous environment with regeneration of an electrophilic species.

The polymerization of N-phenylhydroxylamine or an N-phenylhydroxylamine derivative, according to the present method, is effected by exposing the monomer to dehydrating conditions, preferably in the presence of a Lewis acid catalyst. A dehydrating agent or an equivalent chemical agent effective to combine with the eliminated or "condensed" species promotes instantaneous polymerization and thus minimizes reactor time. The polymer formed, green in color, can be reversibly neutralized with base to a blue material, which can in turn be reversibly oxidized to a red material. As noted above, the poly(N-phenylhydroxylamines) of the invention are highly desirable electroactive materials in terms of processing and production. Yields of the polymer are virtually quantitative.

Solutions of the presently disclosed polymers can be precipitated to give powder, spun into fibers, molded, or cast into films for applications in electroactive coatings, finishes, paints, inks, electrodes and the like, or in blends with other materials. In-still another aspect, then, invention provides methods for making shaped articles, films, fibers, and the like from the novel electroactive polymers.

DETAILED DESCRIPTION OF THE INVENTION

Figure 1:
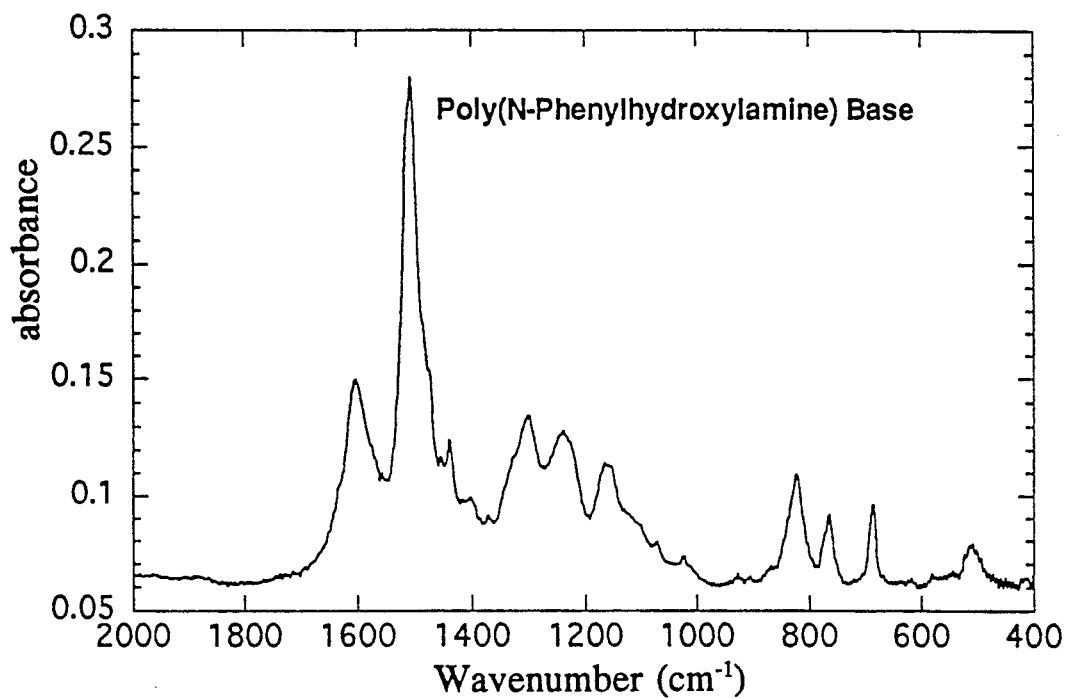
FIGS. 1A and 1B are FT-IR spectra of poly(N-phenylhydroxylamine) (as prepared in Example 1) and emeraldine base, respectively.
Figure 1:
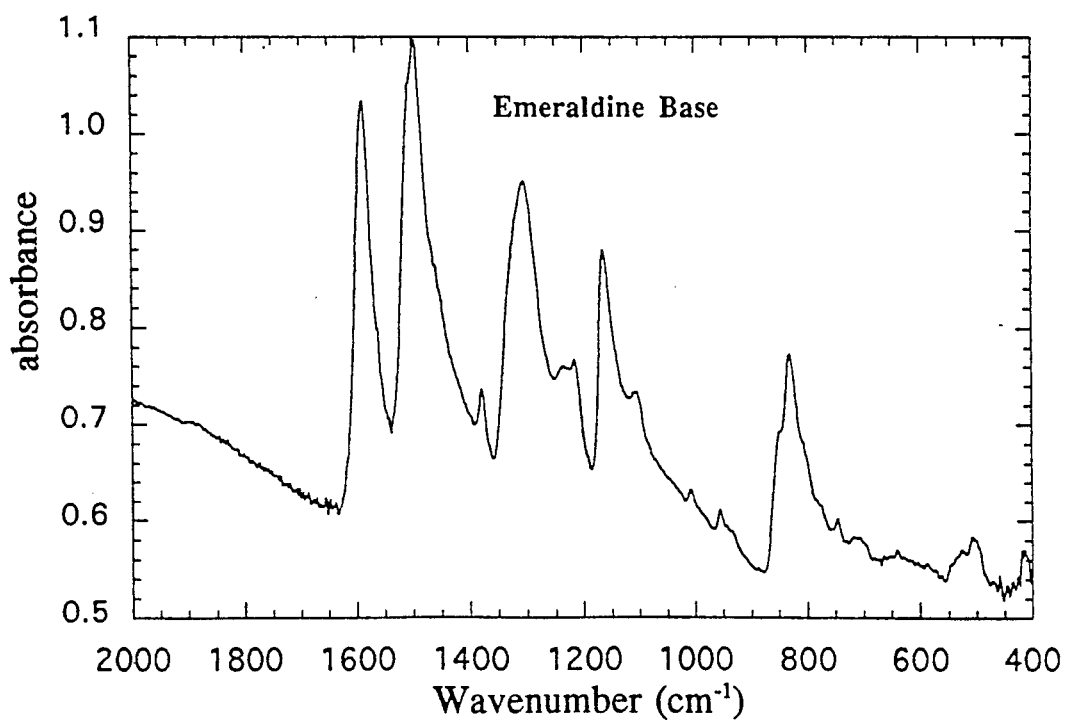

Definitions and nomenclature:

Before the present polymers, methods and uses are disclosed and described, it is to be understood that this invention is not limited to specific starting materials, reagents or reaction conditions, as such may, of course, vary. It is also to be understood that the terminology used herein is for the purpose of describing particular embodiments only and is not intended to be limiting.

It must be noted that, as used in the specification and the appended claims, the singular forms "a," "an" and "the" include plural referents unless the context clearly dictates otherwise. Thus, for example, reference to "a Lewis acid catalyst" includes mixtures of such catalysts, reference to "a solvent" includes mixtures of two or more solvents, reference to "a trapping agent" includes mixtures of such trapping agents, and the like.

In this specification and in the claims which follow, reference will be made to a number of terms which shall be defined to have the following meanings:

The term "electroactive" as used herein refers to a material which has a conductivity of greater than about $10^{-4}$ S/cm, or to a material which may be doped to a conductivity of greater than about $10^{-4}$ S/cm.

The term "poly(N-phenylhydroxylamine)" as used herein encompasses homopolymers and copolymers of N-phenylhydroxylamine or substituted analogs thereof, i.e., polymers formed at least in part from monomers having the structural formula (III) as illustrated and defined below. Similarly, the term "N-phenylhydroxylamine" is used to apply not only to unsubstituted N-phenylhydroxylamine itself but also to all substituted N-phenylhydroxylamines encompassed by formula (III) below, i.e., "derivatives" of N-phenylhydroxylamine.

The term "homogeneous" to describe the polymerization conditions used in the present method is employed in its conventional sense, i.e., to describe a reaction mixture in which all components are dispersed in a single phase.

The term "Lewis acid" as used herein is, similarly, employed in its conventional sense to mean any substance containing an element that is two electrons short of having a complete valence shell. It will be appreciated by those skilled in the art that Lewis acids by definition encompass Bronsted acids, i.e., protonic acids, and these indeed represent the preferred acids for use in conjunction with the present method.

The term "chemical agent" as used herein intends a compound which will combine with the species that is eliminated during the poly(condensation) reaction, via strong hydrogen bonding or through one or more covalent bonds. As will be explained below, the eliminated species is either water or an alcohol. When the eliminated species is water, the "chemical agent" is of course a "dehydrating agent".

The term "trapping agent" as used herein intends a moiety which is effective to cap the growing polymer and terminate polymerization. Such agents are thus useful for controlling the molecular weight of the polymeric product. The "trapping agents" useful herein are typically aromatic species having at least one unsubstituted ring position.

The term "substantially free of cross-links" as used to describe the poly(N-phenylhydroxylamines) of the invention intends a polymer which contains fewer than about 10 cross-links per 100 mer units, more preferably fewer than about 5 cross-links per 100 mer units, and most preferably 1 cross-link or less per 100 mer units.

The term "substantially free of irreducible moieties" as used to describe the poly(N-phenylhydroxamines) of the invention intends a polymer contains less than about 10 wt % irreducible moieties, more preferably less than about 5 wt. %, most preferably less than about 1 wt. %.

The term "acid-soluble" as used herein is intended to mean that a material dissolves to a concentration of at least about 20% (wt./vol) in typical strong acids, e.g., sulfuric acid.

The term "alkyl" as used herein refers to a branched or unbranched saturated hydrocarbon group of 1 to 26 carbon atoms, such as methyl, ethyl, n-propyl, isopropyl, n-butyl, isobutyl, t-butyl, octyl, decyl, tetradecyl, hexadecyl, eicosyl, tetracosyl and the like. Preferred alkyl groups herein contain 1 to 12 carbon atoms. The term "lower alkyl" intends an alkyl group of one to six carbon atoms, preferably one to four carbon atoms. The terms "alkylthio", "alkylsulfinyl", "alkylsulfonyl" and the like intend alkyl groups containing thio, sulfinyl, or sulfonyl moieties, and may or may not be bound therethrough to the backbone of the present polymers.

The term "alkoxy" refers to an alkyl group as defined above bound to the molecular structures of the present invention through an ether linkage. "Lower alkoxy" intends an alkoxy group containing one to six, more preferably one to four, carbon atoms.

"Alkenyl" refers to a branched or unbranched unsaturated hydrocarbon group of 2 to 26 carbon atoms and one or more unsaturated carbon-carbon bonds, such as for example, ethenyl, 1-propenyl, 2-propenyl, 1-butenyl, 2-isobutenyl, octenyl, decenyl, tetradecenyl, hexadecenyl, eicosenyl, tetracosenyl and the like. "Lower alkenyl" refers to an alkenyl group of two to six, more preferably two to four, carbon atoms.

The term "alkylene" as used herein refers to a difunctional saturated branched or unbranched hydrocarbon chain containing from 1 to 24 carbon atoms, and includes, for example, methylene ($-CH_2-$), ethylene ($-CH_2-CH_2-$), propylene ($-CH_2-CH_2-CH_2-$), 2-methylpropylene [$-CH_2-CH(CH_3)-CH_2-$], hexylene [$-(CH_2)_6-$] and the like. "Lower alkylene" refers to an alkylene group of 1 to 6, more preferably 1 to 4, carbon atoms.

The term "acyl" refers to a group of the structure $-(C=O)-Y$, where Y is alkyl, alkenyl, or aryl as defined herein. (The term "aroyl" is also used to mean a $-(C=O)=Y$ group where Y is aryl). Acyl groups include, for example, acetyl, propanyl (or propionyl), isopropanoyl, n-butanoyl (or n-butyryl), octanoyl, eicosanoyl, propenoyl (or acryloyl), 2-methylpropenoyl (or methacryloyl), octanoyl, tetradecenoyl, eicosenoyl, tetracosenoyl, propenoyl, 2-butenoyl, n-2-octenoyl, n-2-tetradecenoyl, 2-chloropentanoyl, 2-chlorotetracosanyl, 3-bromo-2-methacryloyl, benzoyl, 1- and 2-naphthoyl, phenylacetyl, and the like. "Lower acyl" refers to a—(C=O)—Y group wherein Y is a lower alkyl of one to six, more preferably one to four, carbon atoms such that the acyl contains a total of from two to seven, more preferably two to five, carbon atoms. The term "alkanoyl" is used to mean an —X—(C=O)—Y group where Y is as defined above and X is alkylene, preferably lower alkylene.

The term "aryl" as used herein refers to a aromatic species having 1 to 3 rings, but typically intends a monocyclic or bicyclic moiety, e.g., phenyl or 1- or 2-naphthyl groups. Optionally, these groups are substituted with one to four, more preferably one to two, lower alkyl, lower alkoxy, hydroxy, amino, and/or nitro substituents. The term "phenyl" similarly encompasses phenyl groups substituted in this manner. The terms "aryloxy", "arylthio", and "arylsulfonyl" refer to aryl groups bound to the molecular structures described herein through an ether, thioether, or sulfonyl linkage, respectively. The term "alkoxylaryl" intends an aryl group containing one or more alkoxy substituents.

The term "amino" intends a primary amino group —NH$_2$. "Alkylamino" intends a secondary amino group containing a single alkyl substituent, while "dialkylamino" intends a tertiary amino group containing two alkyl substituents.

The term "cycloalkyl" refers to a saturated hydrocarbon ring group having from 3 to 8 carbon atoms, and includes, for example, cyclopropyl, cyclobutyl, cyclohexyl, methylcyclohexyl, cyclooctyl, and the like. Typically, however, cycloalkyl species will contain 5 or 6 carbon atoms.

The term "cycloalkenyl" refers to an unsaturated hydrocarbon ring group having from 3 to 8 carbon atoms and containing one or more double bonds.

"Halo" or "halogen" refers to fluoro, chloro, bromo or iodo, and usually relates to halo substitution for a hydrogen atom in an organic compound. Of the halos, chloro and fluoro are generally preferred.

"Optional" or "optionally" means that the subsequently described event or circumstance may or may not occur, and that the description includes instances where said event or circumstance occurs and instances where it does not. For example, the phrase "optionally substituted phenyl" means that the phenyl may or may not be substituted and that the description includes both unsubstituted phenyl and phenyl where there is substitution. Similarly, a process which is "optionally" carried out in the present of a particular chemical agent means that such an agent may or may not be present.

The Novel Electroactive Polymers:

The polymers of the invention are conjugated, electroactive materials with alternating nitrogen atoms and phenyl rings along the chain. The nitrogen atoms and phenyl rings may be substituted as will be described below, and individual mer units are present in the oxidized quinoidal form as well as in the more reduced benzenoidal form. In the present polymers, the ratio of quinoid mer units to benzenoid mer units in the as-polymerized polymers is less than about 1:3. In contrast to related members of the polyaniline family of polymers, the present polymers are substantially free of cross-links and irreducible moieties, and furthermore are acid-soluble and readily processable into a variety of articles, including fibers, films, and the like.

The quinoid mer units contained within the polymer have the structural formula (I)

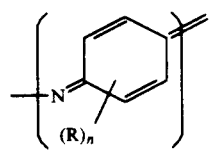

(I)

in which n is an integer in the range of 0 to 4 inclusive, and the R substituents may be the same or different and are selected from the group consisting of alkyl, alkenyl, alkoxy, cycloalkyl, cycloalkenyl, alkanoyl, aroyl, alkylthio, aryloxy, dialkylamino, alkylamino, amino, aryl, alkylsulfinyl, alkylsulfonyl, alkoxyaryl, alkoxyalkyl, arylthio, alkoxycarbonyl, arylsulfonyl, carboxylate, sulfonate, halogen, cyano, nitro, hydroxyl, hydroxylamine, alkyl-substituted hydroxylamine, and alkyl substituted with one or more sulfonate, carboxylate, halo, nitro, cyano, or epoxy moieties, or wherein any two R groups together may form an alkylene or alkenylene chain completing a 3-, 4-, 5-, 6- or 7-membered aromatic or alicyclic ring, which ring is either unsubstituted or substituted with one or more divalent nitrogen, sulfur, phosphorus, or oxygen atoms. Each individual R group can contain up to about 26 carbon atoms, although the total number of carbon atoms in all of the "n" R groups will generally be less than about 40.

The benzenoid mer units contained within the polymer have the structural formula (II), in which the R groups and "n" are as defined above for the ring substituents of the quinoid units.

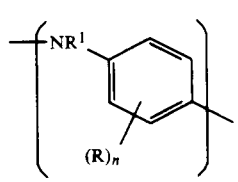

(II)

In structural formula (II), $R^1$ is selected from the group consisting of hydrogen, alkyl, alkenyl, alkoxy, cycloalkyl, cycloalkenyl, alkanoyl, aroyl, aryl, alkylsulfinyl, alkylsilyl, alkylsiloxyl, arylsilyl, arylsiloxyl, alkylsulfonyl, alkoxycarbonyl, hydroxyl, arylsulfonyl, and alkyl substituted with one or more sulfonate, carboxylate, halo, nitro, cyano, or epoxy moieties. Preferred $R^1$ groups are hydrogen, alkyl and aryl.

The polymers of the invention typically have a molecular weight of about 500 to 500,000 g/mole. As will be explained in greater detail below, molecular weight can be controlled by addition of a "trapping agent" during the polymerization reaction. The trapping agent provides one terminus of the polymer chain with an aromatic moiety. Typically, this aromatic moiety will be a monocyclic compound optionally substituted with one or more lower alkyl, lower alkoxy, or amino substituents; specific examples of such moieties include toluene, anisole, and N,N-dimethylaniline.

The polymers may contain, in addition to the above mer units (I) and (II), comonomeric species. Comonomers may be prepared by using two or more N-phenyl-hydroxylamine analogs, or they may be prepared using a substituted or unsubstituted N-phenylhydroxylamine starting material in combination with an entirely different type of comonomer, typically one that contains an unsaturated bond and is capable of undergoing polymerization through electrophilic addition with regeneration of an electrophilic species, in a manner that is compatible with the polymerization of N-phenylhydroxylamines. Suitable comonomers are selected from the group consisting of vinyl-containing compounds, allyl-containing compounds, ethylene, an imine moiety, norbornene or derivatives thereof, azidirines, epoxide molecules containing a phenyl or vinyl unit, cyclo(diphenylsiloxanes), benzofurans, indenes and fullvenes.

The polymer as described above may be acid-doped to a conductivity of greater than about $10^{-4}$ S/cm, preferably using a dopant selected from the group consisting of sulfuric acid and its anhydrides, phosphoric acid and its anhydrides, sulfonic acids, carboxylic acids, sulfuryl halides, sulfuryl oxyhalides, anhydrous hydrogen chloride, phosphorous and phosphoric halides, phosphorous and phosphoric oxyhalides, transition metal halides, alkaline earth halides, anhydrides of carboxylic acids, anhydrides of sulfonic acids, and sulfonyl and acyl halides. Both the oxidation state and the acidic state of the polymer are stable although readily reversible using conventional chemical or electrochemical techniques as will be appreciated by those skilled in the art. See, e.g., Willstater et al., *Chemische Berichte* 40:2665 (1907); MacDiarmid et al., *Synthetic Metals* 41:621 (1991); and Y. Cao et al., *Synthetic Metals* 32:263 (1989).

Synthesis and Use of the Novel Polymers:

In another embodiment of the invention, a method is provided for synthesizing the aforementioned electroactive polymers. The method involves a poly(condensation) reaction of a monomeric starting material which is carried out under anhydrous conditions in the presence of a Lewis acid catalyst. The monomeric starting material has the N-phenylhydroxylamine structure (III)

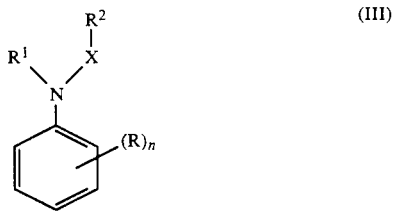

in which R, n and $R^1$ are as defined earlier, X is either oxygen or sulfur, preferably oxygen, and $R^2$ is selected from the group consisting of hydrogen, alkyl, alkenyl, cycloalkyl, cycloalkenyl, alkanoyl, aroyl, aryl, alkylsulfinyl, alkylsilyl, alkylsiloxyl, arylsilyl, arylsiloxyl, alkylsulfonyl, alkoxycarbonyl, arylsulfonyl, cyano, alkyl substituted with one or more sulfonate, carboxylate, halo, nitro, cyano, or epoxy moieties, or $R^2$ may be a cationic species selected from the group of ammonium, tetraalkylammonium, trialkylammonium, dialkylammonium, monoalkylammonium, alkali metals, alkaline earth metals and transition metals. Preferred $R^2$ groups are hydrogen, alkyl, acyl, and arylsulfonyl, and if alkyl, acyl or arylsulfonyl, typically less than about 20 carbon atoms.

The aforementioned monomers may be commercially available, or they may be readily synthesized using methods and materials known to those skilled in the art. Synthetic information as to the preparation of N-phenylhydroxylamine optionally containing phenyl ring substituents is contained in K. Vogel's *Textbook of Practical Organic Chemistry*, 4th Ed. (London: Longman), at p. 722, as well as in European Patent Publication 85511 A2, cited in *Chem. Abs.* 99:212272j (1983). Examples of N-substituted derivatives are contained in Oxley et al, *Org. Synth.* 67:187 (1989); Tsui et al., *J. Org. Chem.* 41(21):3381 (1976); Ghsoh et al., *Sci. Cult.* 37(12):585 (1971); Bartoli et al., *Gazz. Chim. Ital.* 120(4):247 (1990), while examples of O-substituted derivatives are contained in Tisue et al., *Tetrahedron* 24(12):999 (1967); and Sakurai et al., *Chem. Soc. Japan* 58(10):2875 (1985). Thioanalogs of N-phenylhydroxylamine, in which the oxygen atom bonded to the nitrogen is replaced with a sulfur atom, are described in Mathur et al., *Acta Cienc. Indica. Chem.* 11(2):124 (1985). The aforementioned publications are hereby incorporated by reference in their entireties.

As noted above, polymerization is conducted under anhydrous conditions; this is essential in order to obtain the polymer in high yield. For example, in dilute acid where water is abundantly available to react with anilenium intermediates generated, N-phenylhydroxylamine does not undergo polymerization but rather is converted almost quantitatively to p-hydroxyaniline (K. Vogel, *Textbook of Practical Organic Chemistry*, cited supra). The maintaining of anhydrous conditions is therefore highly desirable in the polymerization of N-phenylhydroxylamine.

Polymerization is carried out in the presence of a Lewis acid catalyst which serves to initiate the poly(condensation) reaction. Preferably, the monomer:catalyst ratio does not exceed about 100:1 (wt/wt). The catalyst may be a Bronsted acid or any Lewis acid having affinity for hydroxyl functionalities. In one embodiment, the Lewis acid catalyst also acts as a chemical agent which combines with—either through hydrogen bonding or via covalent bonding—the eliminated species, $R^2$—X—H, which is produced during polymerization. In that case, the Lewis acid catalyst is preferably selected from the group consisting of sulfuric acid and its anhydrides, phosphoric acid and its anhydrides, sulfonic acids, carboxylic acids, sulfuryl halides, sulfuryl oxyhalides, anhydrous hydrogen chloride, phosphorous and phosphoric halides, phosphorous and phosphoric oxyhalides, transition metal halides, alkaline earth halides, anhydrides of carboxylic acids, anhydrides of sulfonic acids, and sulfonyl and acyl halides. Particularly desirable are chemical agents (or "dehydrating agents", where the eliminated species is water) which is sufficiently acidic to act as an in situ doping agent for the poly(N-phenylhydroxylamine) to give the polymeric product a conductivity of greater than about $10^{-4}$ S/cm. Most particularly desirable is a chemical agent which not only serves as an acid dopant, but also by virtue of its long aliphatic chains plasticizes the polymer into a more tractable material. Such materials are typically anhydrides; preferred anhydrides are arylsulfonyl anhydrides containing an aliphatic chain of from about 2 to 28 carbon atoms, e.g., dodecylbenzenesulfonic acid anhydride.

If the Lewis acid is one that does not act to combine with the eliminated species, such a chemical or dehydrating agent is preferably added to the polymerization mixture, and may be chosen from the aforementioned list of agents.

Another method for maintaining anhydrous and/or dehydrating conditions during the polymerization of N-phenylhydroxylamine is through azeotropic removal of the water or alcohol formed by refluxing the monomer in some solvent such as toluene. Such a procedure is standard methodology in poly(condensation) reactions (see, e.g., K. Vogel, *Textbook of Practical Organic Chemistry*, cited supra).

Additional methods of maintaining anhydrous conditions include application of a vacuum (reduced pressure atmosphere) to the monomer-catalyst system, or by flushing of the system with an anhydrous gas. Higher reaction temperatures, to increase the vapor pressure of trace amounts of free water in the reaction system, are desired when employing vacuum or anhydrous gas purging as the dehydrating conditions for polymerization of N-phenylhydroxylamine. Preferred temperatures are in the range of about 50° to about 250° C.

It should also be noted that in the polymerization reaction, monomer purity is important. Extraneous compounds in the polymerization environment may inadvertently act as trapping agents to limit polymer molecular weight drastically. It is preferred that the monomer be greater than about 98 wt. % pure, perhaps greater dependent upon the nature of the impurities, in order to realize molecular weights above about 5000 g/mole.

Polymerization may be carried out in a solvent, and indeed, use of a solvent is preferred. N-Phenylhydroxylamine has unique solubility characteristics in that it dissolves in warm hexane and in water (two extremes of solvent polarity), as well as in a variety of solvents having intermediate polarity. N-Phenylhydroxylamine dissolves in concentrated non-dehydrating acids such as acetic acid, and can be also dissolved in acid anhydrides. A wide variety of solvents may thus be used in conjunction with the poly(condensation) reaction. The solvent must be anhydrous, however, and preferred solvents are Lewis acids. Particularly preferred Lewis acids for use as the solvent are mineral acids such as sulfuric acid. The preferred ratio of monomeric starting material to solvent is at least about 1:10 wt./vol, more preferably at least about 1:5 wt./vol. In a preferred embodiment, the monomer is added to the solvent and dissolved therein prior to polymerization.

It is not, however, essential that a solvent be used. This is because N-phenylhydroxylamine can serves as its own dispersant above its melting point of about 80° C. in the sense that it becomes a free flowing liquid.

If a solvent is used, it is preferred that polymerization be carried out at a temperature in the range of about −25° C. to about 25° C. In the absence of a solvent, as noted above, polymerization is carried out at a higher temperature—typically greater than about 80° C.—so that the monomeric starting material is molten.

Depending on the type and amount of catalyst, polymerization may be substantially complete in a matter of minutes. However, in order to ensure completion of the poly(condensation) reaction, the polymerization mixture may be allowed to sit for as long as several hours before isolating the polymer therefrom.

In order to limit the molecular weight of the polymer, a trapping agent may be added into the polymerization mixture—typically although not necessarily at the outset of the polymerization reaction—so as to cap one terminus of the growing polymer chain. Any trapping agent which will act in this way may be used; typically, such agents are aromatic moieties which have at least one unsubstituted ring position. Preferred such agents are monocyclic aromatic moieties optionally substituted with one or more alkyl, alkoxy, halogen, or amino groups, e.g., toluene, anisole, and N,N-dimethylaniline.

A plasticizing agent may also be incorporated into the polymerization mixture so as to impart fluidity to the reaction medium. The choice of a suitable plasticizing agent will be readily made by one skilled in the art of polymer processing.

The present process is especially useful for preparing shaped articles, films and fibers of the novel electroactive polymers. The polymers may also be used to prepare conductive paints, adhesives, sealants, coatings, inks, miscellaneous liquids, and the like, typically by simply admixing one or more of the present conductive polymers with such products. Conductive products prepared with the novel polymers may be used for static discharge, electrostatic dissipation, electromagnetic shielding, and/or in sensors, batteries, switches, heating elements, integrated circuits, microelectronics and photovoltaic devices.

For shaped articles, the polymer solution can be molded following completion of polymerization and the solvent, if any, then removed using conventional techniques, e.g., evaporation or the like. For films, a solution of the prepared polymer may be made, e.g., in a strong acid such as sulfuric acid, such that a coating mixture is produced, the coating mixture is then cast onto a suitable substrate, and the solvent removed. An alternative technique involves casting the reaction mixture onto a Lewis acid substrate prior to carrying out the polymerization reaction, such that the substrate surface itself catalyzes and participates in polymerization. In such a case, it is not essential that a Lewis acid catalyst be separately incorporated into the reaction mixture. Suitable Lewis acid substrates include, for example, tin oxide, indium oxide, aluminum oxide, and silicon oxide. It is preferred, for making films, that a solvent having a boiling point of less than about 260° C., be used.

Fibers are also readily prepared from the present polymers as follows. Following polymerization, the polymer is isolated by extruding it from an acid solution (typically from a sulfuric acid solution) into a non-solvent for the polymer such as alcohol (typically a lower alcohol, e.g., ethanol, methanol, or the like), water, or a mixture thereof, providing that the concentration of the polymer in the solvent is greater than about 10% wt./vol.

The following examples are put forth so as to provide those of ordinary skill in the art with a complete disclosure and description of how to carry out the methods of the invention and make the electroactive polymers claimed herein, and are not intended to limit the scope of what the inventor regards as his invention. Efforts have been made to ensure accuracy with respect to numbers (e.g., amounts, temperature, etc.) but some errors and deviations should be accounted for. Unless indicated otherwise, parts are parts by weight, temperature is in °C. and pressure is at or near atmospheric.

EXAMPLE 1

N-phenylhydroxylamine crystals (2.0 grams, 0.018 moles), prepared as described in K. Vogel's *Textbook of Practical Organic Chemistry*, 4th ed., (London: Longman), at p. 722, were added all at once to 20 mL stirred sulfuric acid (97%) at 25° C. The crystals dissolved immediately and the solution became a dark green color. After 5 minutes of stirring, the solution was precipitated into 100 mL of water and the green powder collected by filtration. Infrared spectroscopy (KBr pellet) of the green powder revealed weak absorptions at 1590 cm$^{-1}$, indicating C=N bonds of a quinoidal unit, and at 1500 cm$^{-1}$, associated with a benzenoid-amine phenyl ring breathing mode. A sloping absorption band from 4000 to 1600 cm$^{-1}$ was present, as is seen in conducting polymers indicating delocalized carriers which can absorb broadly in the near infrared. Optical spectroscopy of the powder dissolved in sulfuric acid revealed peaks at 1.9, 2.7, 3.9, and 4.3 eV. The conductivity of the pressed powder was found to be $2 \times 10^{-3}$ S/cm. The intrinsic viscosity of the polymer as measured in sulfuric acid (1% w/w) was found to be 1.0 dL/g.

The powder was freed from sulfuric acid by stirring 1.7 grams in 20 mL 1M aqueous ammonium hydroxide for 4 hours. The resulting blue powder was collected and dried to give 1.54 grams pure poly(N-phenylhydroxylamine), for an isolated yield of 94% theoretical. The blue powder was re-dissolved in sulfuric acid to give an identical optical spectrum compared with that of the as-polymerized powder. (The powder can also be partially dissolved in organic solvents such as tetrahydrofuran to give peaks at 3.9 eV [quinoidal phenyl rings] and 2.1 eV [benzenoid phenyl rings] roughly in the ratio of 8:1, indicating a more reduced form of the polyanilines than obtained through polymerization of aniline.) Addition of m-chloroperbenzoic acid in tetrahydrofuran turned the solution red instantly, with bands at 3.0, 3.9, 4.1, and 4.3 eV. The infrared spectrum (KBr pellet) of the poly(N-phenylhydroxylamine) base showed absorptions at 3370 cm$^{-1}$ (strong; assigned to phenyl-NH-phenyl), 1590 cm$^{-1}$ (weak; quinoid), 1500 cm$^{-1}$ (very strong; benzenoid), 1300 cm$^{-1}$ (w), 1240 cm$^{-1}$ (w), 1160 cm$^{-1}$ (w), 820 cm$^{-1}$ (w), 770 cm$^{-1}$ (vw), and 680 cm$^{-1}$ (w).

EXAMPLE 2

Example 1 was repeated, but the polymerization temperature was 0° C. Again, dissolution and appearance of dark green color was instantaneous. The optical spectrum revealed peaks at 1.9, 2.7, 3.9, and 4.3 eV.

EXAMPLE 3

Example 2 was repeated, using fuming sulfuric acid (18-24% sulfur trioxide) instead of 97% sulfuric acid. Polymerization was instantaneous, with spectral peaks at 1.9, 2.7, 3.9, and 4.3 eV.

EXAMPLE 4

Example 1 was repeated, except that the N-phenylhydroxylamine was recrystallized from boiling hexane prior to use. The infrared spectrum of the as-polymerized powder was identical to that of Example 1.

EXAMPLE 5

N-phenylhydroxylamine (2.0 grams, 0.018 moles) as prepared in Example 1 was dissolved in 20 mL glacial acetic acid at 25° C. Concentrated (97%) sulfuric acid (1.0 gram, 0.010 moles) was added, and after stirring for 1 hour the resultant dark green solution was cast onto a slide. After 24 hours, a film was formed, and the remaining free acid was removed by rinsing for 10 minutes with distilled water. The film was dried under vacuum for 6 hours, at which point the conductivity was measured and found to be $1 \times 10^{-3}$ S/cm.

EXAMPLE 6

N-Phenylhydroxylamine (2.0 grams, 0.018 moles) as prepared in Example 1 was dissolved in 20 mL anhydrous glyme (1,2-dimethoxyethane) and 1.0 gram 97% sulfuric acid is added at 25° C. A green solution appears immediately.

EXAMPLE 7

N-Phenylhydroxylamine (2.0 grams, 0.018 moles), recrystallized from hexane as in Example 4, was dissolved in 20 mL benzene and added all at once to 20 mL 97% sulfuric acid with stirring at 25° C. After 30 minutes, the contents were poured slowly into 500 mL 1M ammonium hydroxide cooled to 0° C. The aqueous layer was extracted with 50 mL portions of ether 3 times, and all organic layers combined and dried over anhydrous sodium carbonate. All volatiles were removed at ~20 mm Hg, and the resulting pale yellow solid was dried, yielding 1.64 grams material. Dissolution in hexane, followed by gas chromatography on a Carbowax microcapillary column operating isothermally at 210° C., revealed the substance to be greater than 95% pure. The retention time was precisely that of a commercially obtained sample of N,N-diphenylamine.

Verification of Polymer Structure:

Poly(N-phenylhydroxylamine), as demonstrated, exists in a bluish neutral form (Poly(N-phenylhydroxylamine) base) and in a green, doped acid form (poly(N-phenylhydroxylamine) salt). The as-polymerized green salt contains sulfuric acid, removable upon washing with alkali to give the blue base form, which can be converted to the salt form once again upon exposure to acid.

The fact that poly(N-phenylhydroxylamine) does dope with acid to give an as-polymerized green salt with conductivity on the order of about 10$^{-3}$ S/cm strongly suggests the presence of the more oxidized quinoidal moiety, which does give rise to charge carriers upon protonation.

A more sensitive probe of structure is found in infrared spectroscopy. The FT-IR spectra of poly(N-phenylhydroxylanine) and emeraldine base (prepared through oxidative polymerization of aniline) are shown in FIGS. 1A and 1B, respectively. Absorption bands for both materials exhibit nearly identical characteristics. One distinct difference is the intensity ratio of the bands at 1500 and 1600 cm$^{-1}$, attributable to the benzenoid and quinoid phenyl ring breathing modes, respectively. In poly(N-phenylhydroxylamine), the disproportionately high ratio of benzenoid to quinoid ring intensities indicates a more reduced state of polyaniline, one resembling that of leuco-Emeraldine. The FT-IR spectrum of the as-polymerized poly(N-phenylhydroxylamine) salt is likewise virtually identical to that of Emeraldine salt. The featureless, sloping band from 4000 to 1600 cm$^{-1}$ is typical in doped conducting polymers containing polaron or bipolaron states.

Figure 2:
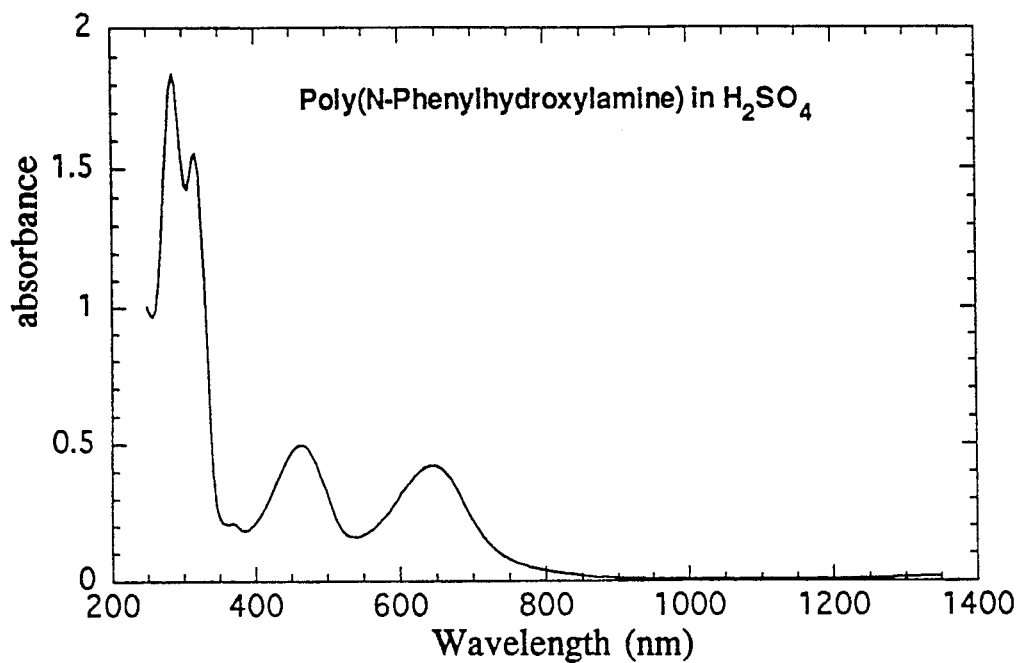
FIG. 2 is the optical spectrum of poly(N-phenylhydroxylamine) (as prepared in Example 1) in sulfuric acid.

The optical spectrum of poly(N-phenylhydroxylamine) in sulfuric acid (emeraldine green in color) is shown in FIG. 2. The strong bands at 3.9 and 4.3 eV represent $\pi \rightarrow \pi^*$ transitions of the benzenoid rings. Weaker bands appear at 1.9 and 2.7 eV, which have been identified in the polyanilines as intramolecular exciton bands between the benzenoid and quinoid phenyl rings. While not wishing to be bound by theory, the inventor herein proposes that the absence of any significant absorption near 1.1 eV in poly(N-phenylhydroxylamine), as is present in Emeraldine salt in sulfuric acid, is perhaps due to the more reduced state of poly(N-phenylhydroxylamine).

Figure 3:
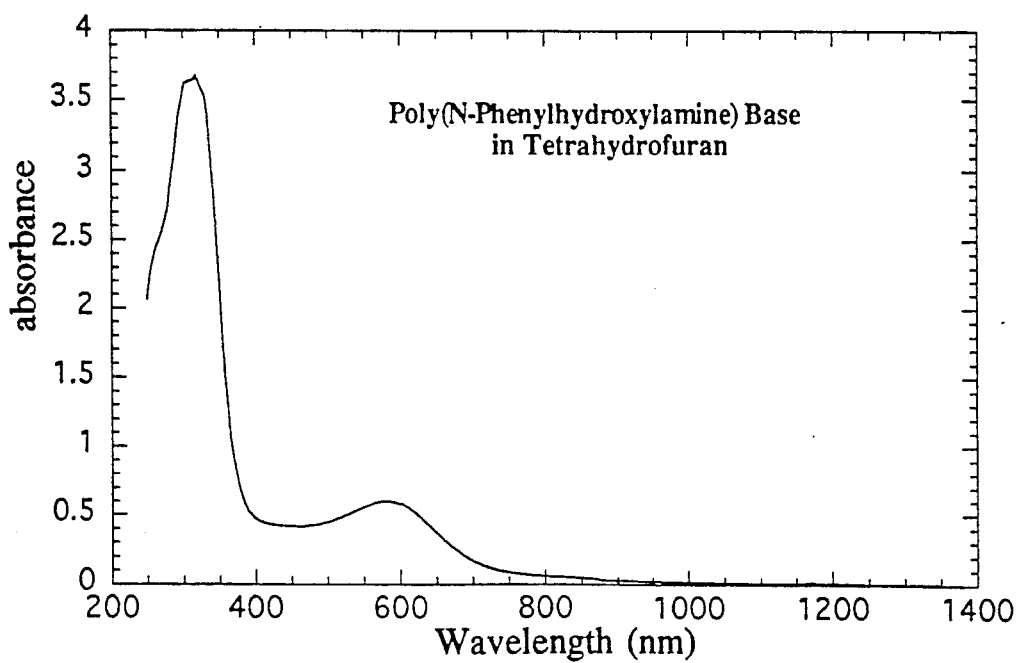
FIG. 3 is the optical spectrum of the base form of poly(N-phenylhydroxylamine), i.e., the polymer prepared in Example 1 as neutralized by ammonium hydroxide.

The optical spectrum of the bluish base form of poly(N-phenylhydroxylamine) (neutralized by ammonium hydroxide washing) is shown in FIG. 3. The peak at 3.9 eV corresponds to a $\pi \rightarrow \pi^*$ transition, which is the sole absorption between 0.8 and 4.0 eV in pure leuco-Emeraldine. The weak poly(N-phenylhydroxylamine) absorption at 2.1 eV indicates the presence of some quinoid phenyl units. Upon addition of an oxidizing agent, such as m-chloroperbenzoic acid, the solution turns red with peaks at 3.9 and 4.3 eV (corresponding to benzenoid $\pi$ to $\pi^*$ electronic excitation), and at 3.0 and 4.1 eV, similar energies as those previously seen for perinigraniline (MacDiarmid et al., *Synthetic Metals* 41:621 (1991)). Addition of a reducing agent such as phenylhydrazine regenerates the more reduced form with a trace absorption at 2.1 eV.

What is claimed is:

1. A method for preparing a conjugated, electroactive polymer, comprising polymerizing, under anhydrous conditions, a monomeric starting material contained within a reaction mixture and having the structural formula (III)

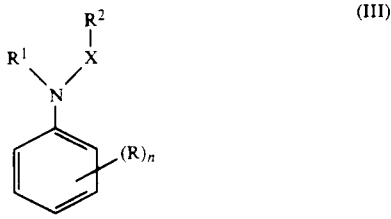

in which:

n is an integer in the range of 0 to 4 inclusive;

the R substituents are independently selected from the group consisting of alkyl, alkenyl, alkoxy, cycloalkyl, cycloalkenyl, alkanoyl, aroyl, alkylthio, aryloxy, dialkylamino, alkylamino, amino, aryl, alkylsulfinyl, alkylsulfonyl, alkoxyaryl, alkoxyalkyl, arylthio, alkoxycarbonyl, arylsulfonyl, carboxylate, sulfonate, halogen, cyano, nitro, hydroxyl, hydroxylamine, alkyl-substituted hydroxylamine, and alkyl substituted with one or more sulfonate, carboxylate, halo, nitro, cyano, or epoxy moieties, or wherein any two R groups together form an alkylene and alkenylene chain completing a 3, 4, 5, 6 or 7-membered aromatic or alicyclic ring, which ring is either unsubstituted or substituted with one or more divalent nitrogen, sulfur, phosphorus, or oxygen atoms;

$R^1$ is selected from the group consisting of hydrogen, alkyl, alkenyl, alkoxy, cycloalkyl, cycloalkenyl, alkanoyl, aroyl, aryl, alkylsulfinyl, alkylsilyl, alkylsiloxyl, arylsilyl, arylsiloxyl, alkylsulfonyl, alkoxycarbonyl, hydroxyl, arylsulfonyl, and alkyl substituted with one or more sulfonate, carboxylate, halo, nitro, cyano, or epoxy moieties;

$R^2$ is selected from the group consisting of hydrogen, alkyl, alkenyl, cycloalkyl, cycloalkenyl, alkanoyl, aroyl, aryl, alkylsulfinyl, alkylsilyl, alkylsiloxyl, arylsilyl, arylsiloxyl, alkylsulfonyl, alkoxycarbonyl, arylsulfonyl, cyano, alkyl substituted with one or more sulfonate, carboxylate, halo, nitro, cyano, or epoxy moieties, or $R^2$ is a cationic species selected from the group of ammonium, tetraalkylammonium, trialkylammonium, dialkylammonium, monoalkylammonium, alkali metals, alkaline earth metals and transition metals; and X is either O or S, such that, as polymerization proceeds, the moiety $R^2$ is removed as the eliminated species $R^2$—X—H, and wherein said polymerizing is in the presence of a Lewis acid catalyst.

2. The method of claim 1, wherein the Lewis acid catalyst acts as a chemical agent to combine with the eliminated species $R^2$—X—H.

3. The method of claim 2, wherein the Lewis acid catalyst is effective to dope the polymer to a conductivity of greater than about $10^{-4}$ S/cm.

4. The method of claim 2, wherein the Lewis acid catalyst is selected from the group consisting of sulfuric acid, sulfuric acid anhydrides, phosphoric acid, phosphoric acid anhydrides, sulfonic acids, carboxylic acids, sulfuryl halides, sulfuryl oxyhalides, anhydrous hydrogen chloride, phosphorous and phosphoric halides, phosphorous and phosphoric oxyhalides, transition metal halides, alkaline earth halides, carboxylic acid anhydrides, sulfonic acid anhydrides, and sulfonyl and acyl halides.

5. The method of claim 4, wherein the Lewis acid catalyst is an arylsulfonyl anhydride containing an aliphatic chain containing from about 2 to 28 carbon atoms.

6. The method of claim 5, wherein the Lewis acid catalyst is dodecylbenzene sulfonic acid anhydride.

7. The method of claim 1, wherein said polymerizing is at a temperature in the range of about $-25°$ C. to about 25° C.

8. The method of claim 1, wherein during or subsequent to polymerization, a vacuum is applied to the reaction mixture.

9. The method of claim 1, wherein during or subsequent to polymerization, the reaction mixture is purged with an anhydrous gas.

10. The method of claim 1, comprising azeotropically distilling subsequent to polymerizing.

11. The method of claim 8, wherein the temperature of the reaction mixture is maintained between about 50° C. and about 250° C. as the vacuum is applied.

12. The method of claim 9, wherein the temperature of the reaction mixture is maintained between about 50° C. and about 250° C. during the purging with anhydrous gas.

13. The method of claim 10, wherein the temperature of the reaction mixture is maintained between about 50° C. and about 250° C. during the azeotropic distillation.

14. The method of claim 1, wherein polymerization is carried out in the presence of a plasticizing agent.

15. The method of claim 1, comprising polymerizing in the presence of a chemical agent effective to combine with the eliminated species $R^2$—X—H.

* * * * *